ent Office 2,776,923
Patented Jan. 8, 1957

2,776,923
**COMPOSITION COMPRISING GLUTAMYLCHO-
LINE SALTS**

Yoshito Nishizawa, Suita, Osaka, Japan

No Drawing. Application September 18, 1953,
Serial No. 381,026

6 Claims. (Cl. 167—65).

This invention relates to 1-glutamylcholine and the method of preparation and composition thereof.

Formerly the present inventor treated poliomyelitis with acetylcholine and obtained a certain degree of therapeutic effect but at the same time found that injection into the spinal canal of this substance caused some untoward side-effects, as headache, temporary rise in body temperature and vomiting. On the other hand, since acetylcholine is decomposed by the cholineesterase in the body, the duration of action of this substance is comparatively short, therefore, it seems to be unreasonable to expect a satisfactory effect from this substance.

Glutamylcholine was prepared to obtain a substitute for acetylcholine, which makes up for the shortcomings of acetylcholine and is as active as acetylcholine.

The basis of the present invention lies in the following points. The aminoacids which take part in the acetylation of choline in the body are alanine, methionine and glutamic acid. Of those, glutamic acid was found to be the most active. It was also found that inoculation of the Lansing's virus into mice decreased the glutamic acid content of the spinal cord to 50% that of normal animals.

It is needless to speak here of the importance of glutamic acid as nutriment of nerves.

Consideration of the above facts as a whole leads naturally to the idea of combining choline with glutamic acid. On the other hand, it was also found that injection of glutamic acid into the spinal canal resulted in the transfer of glutamic acid into the spinal cord.

On the basis of these findings the inventor studied the combination of choline and glutamic acid and finally prepared a new compound, 1-glutamylcholine. Furthermore, by applying this compound to poliomyelitis the inventor obtained a satisfactory effect which had not been obtained by any of the conventional agents. It was also found that oral administration of this compound caused remarkable decrease in hypertension and that this compound was also effective for growth (animal tests only).

Detailed explanation is next made of the invention.

The 1-glutamylcholine of the present invention is prepared by the following process.

N-carbobenzoxy-1-glutamic acid anhydride is reacted with choline to give the choline ester of the acid. In this case, it is natural to assume that the product is a mixture of α- and γ-isomers since glutamic acid is a dibasic acid. Salts, especially chloride, of choline are suitable for this reaction because they are stable. To take cholinechloride as an example, N-carbobenzoxy-1-glutamic acid anhydride is reacted with cholinechloride to yield N-carbobenzoxy-1-glutamylcholinechloride, which is readily converted into 1-glutamylcholinechloride by reduction. This reduction is a type of hydrogenolysis. That is, when a solution of N-carbobenzoxy-1-glutamyl-cholinechloride in a solvent is reduced on platinum or palladium, it is decomposed into 1-glutamylcholine chloride, carbondioxide and toluene. The 1-glutamylcholine chloride is a mixture of 1-glutamyl-α-choline chloride and 1-glutamyl-γ-choline chloride. This hydrogenolysis, however, does not limit the range of this invention. The product is a powder in the dry state but readily absorbs humidity to become syrupy. It is easily soluble in water, ethanol and methanol, and slightly soluble in ether, chloroform and acetone. Administration of this mixture of α- and γ-isomers causes no untoward side-effects.

Treatment of the product with silver oxide gives the free ester, which is basic and unstable.

The reactions proceed according to the following chart.

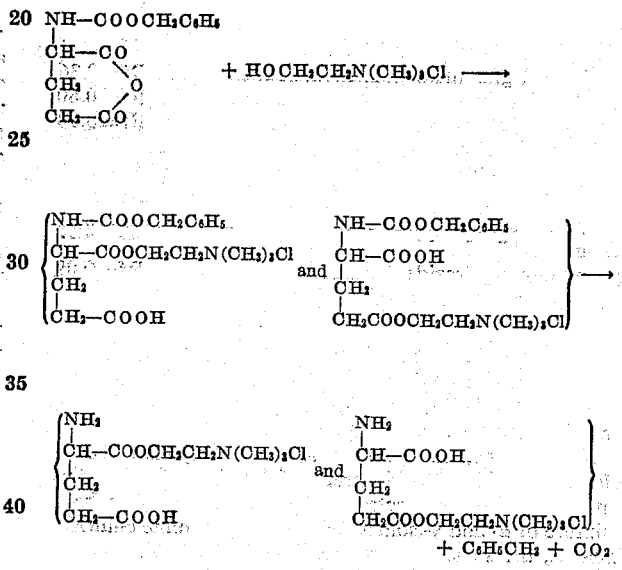

The present inventor subjected the 1-glutamylcholine chloride thus obtained to paper partition chromatography using butanol·acetic acid·water (4:1:1) as solvent until the front reached about 20 cm. from the origin and then sprayed the paper with the ninhydrin and the Dragendorff's reagents, when only one spot of the 1-glutamyl-choline chloride appeared at $Rf=0.06$-$0.12$. However, when the operation was continued until the front reached 30–40 cm. from the origin, the above spot was divided into two spots, $Rf=0.07$-$0.09$ and $Rf=0.11$-$0.12$. From this fact it is evident that the 1-glutamylcholine chloride is a mixture of two components. Of course, in all cases the spot of glutamic acid revealable with ninhydrin and that of choline revealable with the Dragendorff's reagent were noted besides the above spots.

Le Quesne et al. (J. Chem. Soc. 1954, 1959 (1950), 24 (1952) found that reaction between N-carbobenzoxy-glutamic acid anhydride and alcohol gives a mixture of α- and γ-esters, and reaction between N-carbobenzoxy-aspartic acid anhydride and alcohol yields a mixture of α- and β-esters. They also found that reaction of N-carbobenzoxyglutamic acid anhydride with an aminoacid gives chiefly α-peptide and secondarily γ-peptide, and reaction of N-carbobenzoxyaspartic acid anhydride with an aminoacid affords chiefly α-peptide and secondarily β-peptide. They isolated these products and identified them. Moreover, they obtained a mixture of α- and γ-hydrazides of N-carbobenzoxyglutamic acid from N-carbobenzoxyglutamic acid anhydride and hydrazine. On the other hand, Bergmann (Ber. 65, 1196 (1932)) synthesized isoglutamine from N-carbobenzoxyglutamic acid anhydride and ammonia, but Melville (Biochem. J. 29, 192 (1935)) pointed out that the Bergmann's product was a mixture of α- and γ-amides in a ratio of 6:1. The present inventor also prepared α- and γ-isomers of methyl, ethyl and propylesters and the hydrazide of 1-glutamic acid. Paper partition chromatography of these products under the same conditions as above showed that in general the Rf's of the α-isomers were larger than those of the γ-isomers, and the color nuance by ninhydrin of the α-isomers was different from that of the γ-isomers. The color of the γ-isomers turned from yellowish purple into purple by heating whereas that of the γ-isomer went from reddish purple to purple. Furthermore the coloration of the γ-isomers was more rapid and sensitive and the fading was slower than those of the γ-isomers.

Methyl-α-1-glutamate _____ Rf=0.46
Methyl-γ-1-glutamate _____ Rf=0.36
Ethyl-α-glutamate _____ Rf=0.60
Ethyl-γ-1-glutamate _____ Rf=0.50
n-Propyl-α-1-glutamate _____ Rf=0.66
n-Propyl-γ-1-glutamate _____ Rf=0.58
1-isoglutamine _____ Rf=0.21
1-glutamine _____ Rf=0.11
α-1-glutamylhydrazide _____ Rf=0.17
γ-1-glutamylhydrazide _____ Rf=0.09

From the above facts it is evident that the substances corresponding to Rf=0.11–0.12 and Rf=0.07–0.09 are 1-glutamyl-α-choline chloride and 1-glutamyl-γ-choline-chloride, respectively.

Furthermore, the present inventor subjected the 1-glutamylcholine chloride prepared by th method of this invention to paper electrophoresis and found it to be a mixture of α- and γ-isomers of 1-glutamylcholine chloride. That is, the substance was developed on a filter paper 1 cm. wide over a period of 4 hours with 1 Amp. current, using phosphate buffers of various pHs as solvent. When the filter paper was sprayed with the Dragendorff's reagent, three spots, B, A and D, appeared on the negative pole side, while when the filter paper was sprayed with the ninhydrin reagent a spot, C, appeared on the positive pole side and two spots, B and A, on the negative pole side. Cholinechloride and glutamic acid were also subjected to paper electrophoresis under the same conditions as above, and the former gave spot D with the Dragendorff's reagent and the latter spot C with the ninhydrin reagent. From these facts it is clear that the spots A and B represent the α- and γ-isomers of the 1-glutamyl-choline chloride though it is not evident which is which.

When N-carbobenzoxy-1-glutamylcholine chloride was reduced catalytically and the catalyser was filtered off, some crystals were found in the catalyser. Reaction of the crystals with hydrazine gave colorless plates, M. P. 160° C., $[\alpha]_D^{15}=+12.7°$, which coincide well with γ-1-glutamyl-hydrazide, therefore, the crystals are 1-glutamyl-γ-choline chloride. Development by electrophoresis of the crystals also gave a spot at A with the Dragendorff's reagent. Consideration of the above facts as a whole shows that A represents 1-glutamyl-γ-choline chloride and B 1-glutamyl-α-choline chloride. The product of the present invention is accordingly a mixture of α- and γ-isomers of 1-glutamylcholine chloride.

Moreover, the present inventor confirmed the product of this invention to be a mixture of 1-glutamyl-α-choline chloride and 1-glutamyl-γ-choline chloride from the following facts.

Reaction of the crude 1-glutamylcholine chloride, which was prepared by catalytic reduction of N-carbobenzoxyl-1-glutamylcholine chloride, with methanolic ammonia resulted in the isolation of crystals, M. P. 173° C., $[\alpha]_D 32=+20.9°$, which coincide well with 1-isoglutamine (I). From the mother liquor of the crystals other crystals were isolated, which coincided with 2-ketopyrolidine-5-carboxylic acid (II). The glutamic acid obtained from the crude 1-glutamylcholine chloride by the hydrolysis with hydrochloric acid had a melting point of 204–205° C. and $[\alpha]_D^{15}=+12.5°\pm0.5°$. Reaction of N-carbobenzoxy-1-glutamylcholine chloride with methanolic ammonia resulted in the separation of crystals which coincided with N-carbobenzoxy-1-isoglutamine (VI), and reduction of the crystals gave 1-isoglutamine (I). Reduction of the oily substance which was separated from the mother liquor of (VI) gave crystals, M. P. 183° C., $[\alpha]_D^{15}=+7.5°\pm0.7°$, which coincided with 1-glutamine (VII), therefore, the oily substance is N-carbobenzoxy-1-glutamine (VIII).

From the facts mentioned so far it is evident that the reaction product between N-carbobenzoxy-1-glutamic acid anhydride and cholinechloride is a mixture of α- and γ-choline esters of N-carbobenzoxy-1-glutamic acid, and the reduction product of the product is a mixture of 1-glutamyl-α-choline chloride and 1 - glutamyl - γ - choline chloride.

The relationship between these facts is explained by the following chart. (See columns 5 and 6.)

Next the physiological action of this agent and its therapeutical effect in poliomyelitis will be taken up. When the action of 1-glutamylcholine chloride is examined with the Magnus test, using excised rat intestine the action is ½₀₀ that of acetylcholine which has been used up to now. In tests on rabbit blood pressure, the action is ⅒ that of acetylcholine when injected intravenously. However, when this agent is injected intrathecally it has the same degree of action with the same amount and furthermore the duration of action is five (5) times longer than acetylcholine. The fact that there is this great difference in the strength of action according to the site of administration means that the affinity of the agent towards nerves is strong and that a greater quantity is transferred to the spinal cord than acetylcholine. The fact that the duration of action is longer shows that differing from acetylcholine, this agent is unaffected by cholinesterase.

In poliomyelitis, the chronaxie value of the paralyzed muscles rises from about one week after paralysis sets in and in severe cases reaches infinity and cannot be measured. When treated with this agent the muscle chronaxie gradually drops. This drop is much more rapid and the return to normal values is much earlier compared to acetylcholine. This has been shown not only in poliomyelitis patients but has been proven in monkeys experimentally infected with the Lansing virus.

Electromyographic studies were carried out before and after injection of this agent and the course was followed according to time. The electric wave arising from movement in the anterior tibial muscle was photographed by means of a magnetic oscillograph. A surface electrode was used as the lead and a R-C-4 amplifier was used for amplification. Discharge of motor unit voltages reaches a maximum three (3) hours after injection and shows a value close to normal. Even after twenty-four (24) hours a marked effect can still be seen. This can be interpreted to mean that the muscle has recovered its function due to injection of the agent and that the function of the motor neurons have returned to normal even if only temporarily.

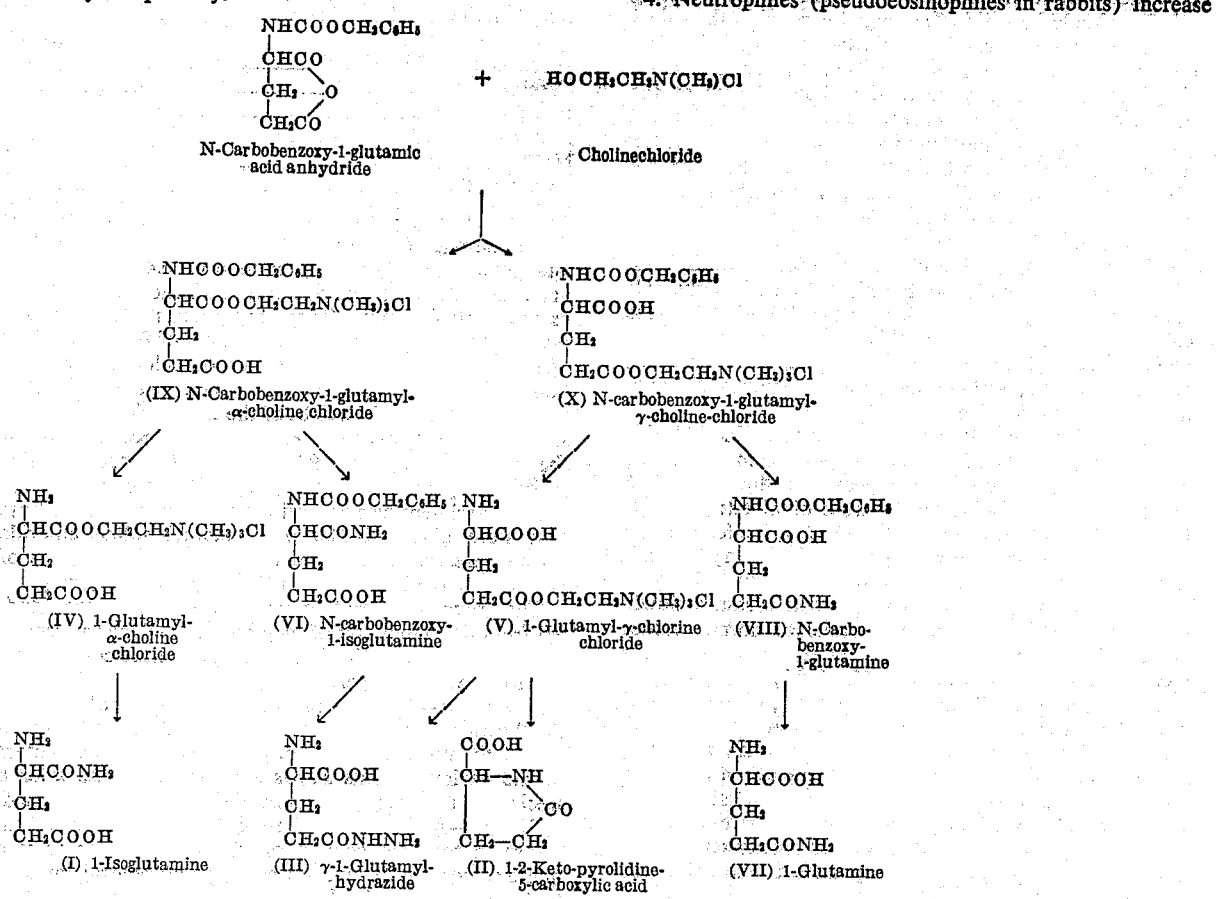

Formosan monkeys (Macaca cyclopis) were inoculated with the Lansing virus and developed typical paralysis of the extremities. Of five (5) which survived, two (2) showing the slightest symptoms were set aside and left untreated as controls. The remaining three (3) were given intraspinal injections of 5.0 mg. 1-glutamylcholine chloride every two days and complete recovery was attained after thirty (30), forty-five (45) and forty-nine (49) injections. At this time the controls still had residual paralysis and could walk only with difficulty. All five (5) monkeys were sacrificed after identical number of days had elapsed since onset and the histopathological changes in the spinal cord examined microscopically. Hematoxylin and eosin, Bielschowsky's and Weigert-Pal's stain was used for staining. In the treated monkey, the nerve cells remaining in the anterior horn of the spinal cord are more numerous, less atrophied, stain better and on the whole are closer to normal than those in the untreated control. The nerve fibers too are less atrophied, stain better, the course is straighter and demylinization is slighter in the treated animal. Of special interest is the fact that there is a regeneration of nerve fibers from the atrophied nerve cells in the treated monkey.

Toxicity studies were carried out. When more than 80 mg./kg. is injected intravenously in guinea pigs, the pupils dilate, followed by convulsions and death ensues in about 6 minutes. With 70 mg./kg. the gait becomes unsteady but there is a return to normal in 2 to 3 minutes. Rabbits are unaffected by the intravenous injection of 80 m./kg. The following changes were noted after intravenous (20 mg./kg. in guinea pigs, 30 mg./kg. in rabbits) or introthecal (10 mg./kg. in rabbits) injection of this agent.

1. There is a tendency for increase in erythrocytes.
2. No marked change is noted in hemoglobin content.
3. Leucocytes increase within 10–30 minutes.
4. Neutrophiles (pseudoeosinophiles in rabbits) increase with shift to the left. The increase in leucocytes is due to this.
5. Eosinophiles increase in guinea pigs and decrease in rabbits.
6. Lymphocytes decrease.

0.1–0.3 mg. 1-glutamylcholine chloride was experimentally injected intraspinally in poliomyelitis patients. Five minutes after injection, the blood pressure dropped slightly, the pulse rate decreased a little but there was no change in respiratory rate and unpleasant side effects as headache, vomiting, rise in temperature, anorexia or others were not observed. Examination of the blood showed that there was a slight increase in leucocytes, decrease in eosinophiles and lymphocytes and the findings corresponded with those seen in the experimental animals. These changes disappeared in 24 hours. Aside from a slight increase in protein, no marked change was observed in the spinal fluid. In adults fifty (50) mg. may be used and in children up to twenty-five (25) mg. may be used without occurrence of untoward reactions. From the above findings it can be seen that the toxicity of this agent is very low.

1-glutamylcholine chloride is injected intraspinally in the treatment of poliomyelitis. A single dose for adults is 0.1–2.0 mg. dissolved in sterile distilled water, sterile physiological saline, sterile isotonic solutions containing glucose or fructose or other solutes which can be injected intraspinally. Vitamin B₁, C and other substances which do not react with 1-glutamylcholine chloride may be combined. The normal single dosage is 0.1–2.0 mg. but the range may be broadened to 0.1–50.0 mg. (in the case of children, 0.1–25 mg.) without ill effect. 0.1–50.0 mg. of 1-glutamylcholine chloride may be injected alone or in conjunction with vitamin B₁ or its derivatives. The usual dosage of vitamin B₁ is 5–20 mg. Identical effects may be expected by using a vitamin B₁ derivative in place of vitamin B₁ hydrochloride. The pH of the injecting solution should be within the range tolerated in the spinal canal. In other words it should be above pH 3. The pH of the aqueous solution of 1-glutamylcholine chloride is 3-4. This may be used without change or the pH may be adjusted to weakly acid. Alkalinity causes breakdown of 1-glutamylcholine chloride so is unsuited for use or storage. Alkalines which may be used for neutralization are alkaline bicarbonate, carbonate, hydroxide and others which are normally used in the neutralization of injection solutions.

1-glutamylcholine chloride can be used alone or with other substances which can be injected intraspinally. Of course such substances as decompose 1-glutamylcholine chloride must be avoided in this case. Substance usable with 1-glutamylcholine chloride are sodium chloride, glucose, fructose, sodium bicarbonate, vitamin C, vitamin B₁ and its derivatives.

Eight (8) to ten (10) mg. 1-glutamylcholine chloride was given orally to 97 cases of hypertension (including nephritic hypertension) and the course followed for 2–6 months. The following results were obtained: Very effective—35 (36%), effective—30 (30%), ineffective—22 (27.7%). The patients were permitted to carry on their routine everyday schedule during treatment. 10 days after instillation of treatment the blood pressure slowly started to drop and gradually approached normal values and remained fairly constant thereafter. After 6 months a certain level was still being held. Subjective symptoms as headache, tinnitis (ringing of the ears), dizziness, stiffness of the shoulders and others disappear promptly. A marked response was obtained in cases with trembling of the hands and speech difficulty which had not improved with other types of treatment. Oral administration of this agent also brought relief from obstinate constipation and in thirteen (13) cases out of twenty-seven (27) in which a positive protein was present in the urine, the urine became negative.

The following is a part of the results obtained in the out-patients section.

| Age | Sex | B. P. before Administration | | No. of mos. GLc Administered | Present B. P. | |
|---|---|---|---|---|---|---|
| | | max. | min. | | max. | min. |
| 54 yrs | ♀ | 182 | 102 | 2 | 140 | 88 |
| 45 yrs | ♀ | 176 | 118 | 6 | 126 | 78 |
| 50 yrs | ♀ | 182 | 110 | 6 | 130 | 80 |
| 63 yrs | ♀ | 210 | 120 | 6 | 152 | 80 |
| 58 yrs | ♀ | 170 | 120 | 4 | 130 | 88 |
| 50 yrs | ♀ | 166 | 106 | 2 | 146 | 94 |
| 70 yrs | ♂ | 206 | 96 | 2 | 156 | 86 |
| 68 yrs | ♂ | 206 | 102 | 4 | 160 | 105 |
| 60 yrs | ♂ | 230 | 120 | 6 | 176 | 86 |
| 52 yrs | ♂ | 170 | 110 | 2 | 130 | 88 |
| 64 yrs | ♂ | 204 | 118 | 3 | 156 | 80 |
| 54 yrs | ♂ | 208 | 115 | 2 | 158 | 100 |
| 62 yrs | ♂ | 242 | 146 | 3 | 186 | 102 |
| 57 yrs | ♂ | 208 | 100 | 3 | 144 | 78 |
| 50 yrs | ♂ | 236 | 136 | 2 | 184 | 112 |
| 52 yrs | ♂ | 182 | 108 | 2 | 146 | 88 |
| 60 yrs | ♂ | 205 | 130 | 2 | 150 | 85 |
| 62 yrs | ♂ | 200 | 130 | 3 | 164 | 96 |
| 58 yrs | ♂ | 208 | 110 | 2 | 152 | 90 |
| 53 yrs | ♂ | 198 | 120 | 2 | 156 | 98 |

In the case of hypertension, it is advisable to administer the agent per os. A dose for adult is 5–10 mg., but it is safely increased or decreased depending on conditions of the disease. The agent is generally mixed with one or more of carriers, such as sweet potato starch, milk sugar, dextrine and magnesium stearate.

The growth accelerating action of 1-glutamylcholine chloride will be taken up next. Immature white rats, 4–5 weeks old and weighing approximately 40 g. were raised on the diet shown below.

| | Percent |
|---|---|
| Wheat flour (white) | 67.5 |
| Casein | 15.0 |
| Powdered whole milk | 10.0 |
| Butter | 5.2 |
| NaCl | 0.8 |
| pptd CaCO₃ | 1.5 |

To this basic diet was added one of the following: 1.0 mg. glutamylcholine, a mixture of 0.4 mg. each of choline and glutamic acid, 0.4 mg. choline or 0.4 mg. glutamic acid. A fifth group was fed only the basic diet and taken as the control group. These five groups were observed over a period of 6 weeks. The amount of food consumed was adjusted so that the number of calories per gram body weight was equal in each group. At the end of 6 weeks, the increase in weight of the glutamylcholine group was 144 g. and was the greatest of any group. That of the control group was 92 g. and the glutamylcholine group had gained twice the weight of the control. The same experiment was carried out with silkworms. Those that were given 50–100 γ 1-glutamylcholine chloride showed greater growth and the weight and thickness of the cocoon was greater than that of a control group.

The growth accelerating action shown above was studied from the standpoint of metabolism. In the rat growth experiment the protein, fat and carbohydrate content was measured every two weeks.

1. *Protein.*—Increase in weight becomes marked about the third week and a corresponding decrease in total nitrogen of the urine is observed. The total nitrogen content of the various organs shows a general increase after 6 weeks and a tendency for increase per gram is also noted.

2. *Fat.*—At six weeks there is a tendency for an increase in total fat content of the blood and there is a marked increase in total fat content and neutral fat content of the whole animal.

3. *Carbohydrate.*—The glycogen content of the muscles is markedly increased in the glutamylcholine group at six weeks.

In this way protein, fat and carbohydrate are increased in the 1-glutamylcholine chloride group. Analysis of the water content of the organs shows that compared to the control, there is no increase in water content so that it can be seen that the increase in body weight is not due to storage of water but is brought about by increase in the organ parencyma.

4. *The K and Ca content of the muscles.*—At 4 weeks a tendency for an increase in K and a decrease in Ca is noted and at 6 weeks, this becomes quite marked. This suggests an increased function of the adrenal cortex and histological findings seem to bear this out. This means that in animals raised with 1-glutamylcholine chloride, a condition of parasympathicotonia is brought about and this is related to the effectiveness of glutamylcholine in hypertension.

5. *Histological Findings.*—

(a) Hypophysis: In the 1-glutamylcholine chloride group, there is a slight hypertrophy and an increase in number of the acidophilic cells and dilation of the capillaries and hyperemia is marked.

(b) Testes: A picture of increased secretory function, though very slight, is observed in the interstitial cells.

(c) Adrenals: Measurement of the nuclear diameter reveals that there is hypertrophy of the cells of all layers. The condition of the mitochondria and secretory granules suggest a rise in secretory function both in the cortex and in the medulla.

*Example 1*

A mixture of 1 part of N-carbobenzoxy-1-glutamic acid anhydride (Ber. 65, 1192 (1932), 66, 1288 (1933)) and 0.4 part of cholinechloride is heated under reduced pressure and avoiding humidity to such a degree that the mixture remains melted, whereupon a reaction sets in and the reaction mixture eventually solidifies. The resulting product, which is a mixture of α- and γ-isomers of N-carbobenzoxy-1-glutamylcholine chloride, is a powder even after purification, but its platinum chloride salt is crystalline. The yield is 0.5 part.

A solution of 0.5 part of the N-carbobenzoxy-1-glutamylcholine chloride in 5 parts of methanol is added to 0.25 part of 25% hydrochloric acid and reduced according to the conventional method in the presence of platinum oxide. The catalyser is filtered off, and the filtrate is evaporated to dryness under reduced pressure, and the residue is allowed to stand in a desiccator, the product is then obtained in powder form. The product, a mixture of α- and γ-isomers of 1-glutamylcholine chloride, is highly hygroscopic and difficult to purify. The yield is 0.3 part.

*Example 2*

A solution of 0.5 part of the N-carbobenzoxy-1-glutamylcholine chloride in 5 parts of ethanol is reduced as in Example 1 in the presence of 1.5 parts of palladium. The catalyser is filtered off, the filtrate is evaporated to dryness under reduced pressure, and the residue is allowed to stand in a desiccator to obtain the product in the powder form. The product is a mixture of α- and γ-isomers of 1-glutamylcholine chloride. The yield is 0.3 part.

*Example 3*

1. 1-glutamylcholine chloride _____ g__ 0.5

1 is dissolved in distilled water for injection to make 100 cc. of the solution and the solution is filtered with filter paper or with a sintered glass filter, filled in ampuls and finally sterilized in steam intermittently.

*Example 4*

1. 1-glutamylcholine chloride _____ g__ 2.0

1 is dissolved in distilled water for injection to make 100 cc. of the solution and the solution is filtered, filled in ampuls and sterilized as in Example 3.

*Example 5*

1. 1-glutamylcholine chloride _____ g__ 1.0
2. Dextrose _____ g__ 5.0

1 and 2 are dissolved in distilled water for injection and the solution is worked up as in Example 3.
Fructose can be used in place of dextrose.

*Example 6*

|   | Part |
|---|---|
| 1. 1-glutamylcholine chloride | 0.002 |
| 2. Sweet potato starch | 0.115 |
| 3. Dextrine | 0.02 |
| 4. Milk sugar | 0.05 |
| 5. Citric acid | 0.001 |
| 6. Magnesium stearate | 0.002 |

1, 2, 3, 4, 5 and 6 are mixed to make tablets.

What is claimed is:
1. A mixture of L-glutamyl-α-choline salt corresponding to the formula

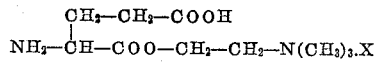

and L-glutamyl-γ-choline salt corresponding to the formula

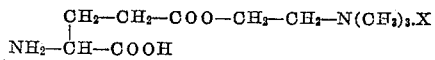

wherein X represents an anion.

2. A mixture of L-glutamyl-α-choline salt corresponding to the formula

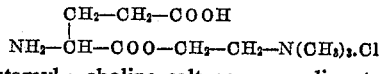

and L-glutamyl-γ-choline salt corresponding to the formula

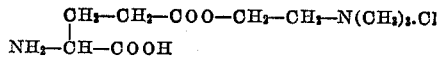

3. A composition for treating poliomyelitis comprising not less than 0.5 percent of a mixture of L-glutamyl-α-choline chloride and L-glutamyl-γ-choline chloride and a sterile parenteral water diluent at pH about 3.0.

4. A composition for treating poliomyelitis comprising from about 0.5 to about 2.0 percent of a mixture of L-glutamyl-α-choline chloride and L-glutamyl-γ-choline chloride and a sterile parenteral water diluent at pH about 3.0.

5. A composition for treating poliomyelitis comprising not less than 0.5 percent of a mixture of L-glutamyl-α-choline chloride and L-glutamyl-γ-choline chloride and a sterile parenteral water diluent and substances which can be injected intraspinally and which do not react with the mixture of L-glutamyl-α-choline chloride and L-glutamyl-γ-choline chloride.

6. A composition for treating hypertension comprising not less than 1 percent of a mixture of L-glutamyl-α-choline chloride and L-glutamyl-γ-choline chloride and a pharmaceutical carrier.

References Cited in the file of this patent

Le Quesne et al.: Journal Chem. Soc., 1958-9 (1950).